(12) United States Patent
Yang et al.

(10) Patent No.: US 11,053,128 B2
(45) Date of Patent: Jul. 6, 2021

(54) TWO-DIMENSIONAL CLAY BASED COMPOSITE PHOSPHORUS REMOVING AGENT AND PREPARATION METHOD AND APPLICATION THEREOF

(71) Applicant: CENTRAL SOUTH UNIVERSITY, Hunan (CN)

(72) Inventors: Huaming Yang, Hunan (CN); Hongyun Chen, Hunan (CN); Jing Ouyang, Hunan (CN); Liangjie Fu, Hunan (CN); Yi Zhang, Hunan (CN); Sainan Liu, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 0 days.

(21) Appl. No.: 16/726,812

(22) Filed: Dec. 24, 2019

(65) Prior Publication Data
US 2020/0385276 A1     Dec. 10, 2020

(30) Foreign Application Priority Data
Jun. 6, 2019   (CN) .......................... 201910491643.3

(51) Int. Cl.
  *C01B 33/26*   (2006.01)
  *C02F 1/28*    (2006.01)
  *B01J 20/16*   (2006.01)
  *B01J 20/30*   (2006.01)
  (Continued)

(52) U.S. Cl.
  CPC ............... *C01B 33/26* (2013.01); *B01J 20/16* (2013.01); *B01J 20/28014* (2013.01);
  (Continued)

(58) Field of Classification Search
  CPC .. B01J 20/16; B01J 20/28014; B01J 20/3021; B01J 20/3078; C01B 33/26;
  (Continued)

(56) References Cited

PUBLICATIONS

Tian, S., Jiang, P., Ning, P., Su, Y., "Enhanced adsorption removal of phosphate from water by mixed lanthanum/aluminum pillared montmorillonite", Chem. Eng. Journal, 151, 141-148 (Year: 2009).*

(Continued)

*Primary Examiner* — James C Goloboy
(74) *Attorney, Agent, or Firm* — JCIPRNET

(57) ABSTRACT

The present invention belongs to the field of material preparation, and particularly relates to a two-dimensional clay based composite phosphorus removing agent and a preparation method. The two-dimensional clay based composite phosphorus removing agent provided by the present invention takes two-dimensional clay, hydroxide (such as lanthanum hydroxide, calcium hydroxide, magnesium hydroxide and aluminum hydroxide) and urea as raw materials, and the composite phosphorus removing agent with high property is prepared by a roasting method. Through a combined physical and chemical method, phosphorus in the phosphorus-containing wastewater is effectively removed by the synergic interaction between components of the composite phosphorus removing agent. The invention overcomes the defects of large consumption and secondary pollution easily caused by using metal hydroxides, metal oxides and metal salts separately as chemical phosphorus removing agents, and simultaneously expands the application fields of the two-dimensional clay.

16 Claims, 6 Drawing Sheets

(51) Int. Cl.
*B01J 20/28* (2006.01)
*C02F 101/10* (2006.01)

(52) U.S. Cl.
CPC ....... *B01J 20/3021* (2013.01); *B01J 20/3078* (2013.01); *C02F 1/288* (2013.01); *C01P 2002/72* (2013.01); *C01P 2004/03* (2013.01); *C01P 2004/20* (2013.01); *C02F 1/281* (2013.01); *C02F 2101/105* (2013.01)

(58) Field of Classification Search
CPC .............. C01P 2002/72; C01P 2004/03; C01P 2004/20; C02F 1/281; C02F 1/288; C02F 2101/105
See application file for complete search history.

(56) References Cited

PUBLICATIONS

De Castro, L.F., Brandao, V.S., Bertolino, L.C., de Souza, W.F.L, Teixeira, V.G., Phosphate Adsorption by Montmorillonites Modified with Lanthanum/Iron and a Laboratory Test using Water from the Jacaepagua Lagoon (RJ, Brazil), J. Braz. Chem. Soc. 30 , 3, 641-657 (Year: 2018).*

Sivaiah, M.V., Petit, S., Brendle, J., Patrier, P., "Rapid synthesis of aluminum polycations by microwave assisted hydrolysis of aluminum via decomposition of urea and preparation of Al-pillared montmorillionite", Applied Clay Science, 48, 2010, 138-145 (Year : 2010).*

\* cited by examiner

TWO-DIMENSIONAL CLAY BASED COMPOSITE PHOSPHORUS REMOVING AGENT AND PREPARATION METHOD AND APPLICATION THEREOF

CROSS-REFERENCE TO RELATED APPLICATION

This application claims the priority benefit of China application serial no. 201910491643.3, filed on Jun. 6, 2019. The entirety of the above-mentioned patent application is hereby incorporated by reference herein and made a part of this specification.

BACKGROUND

Technical Field

The present invention belongs to the field of inorganic non-metallic materials, and particularly relates to a two-dimensional clay based composite phosphorus removing agent and a preparation method.

Description of Related Art

At present, water eutrophication is increasingly serious, which affects the water environment and human landscape, seriously destroys the ecological balance, greatly limits the sustainable development of society, and threatens the survival and development of human beings. The prevention and treatment of water eutrophication has become an urgent problem to be solved in the field of environmental engineering. Excessive phosphorus content is one of the reasons for water eutrophication, so effectively reducing the total phosphorus content in water is one of the key means to control the eutrophication degree of water. In view of this, the relevant departments of China have carried out more and more strict control over emission indexes of phosphorus in sewage. The phosphorus in the phosphorus-containing wastewater mainly comes from the use of phosphorus-containing detergents in life, over-use of phosphorous fertilizers in agricultural production, phosphate wastewater generated in phosphorous chemical enterprises and metal surface treatment processes, livestock manure in the breeding industry and the like.

Currently, phosphorus-containing wastewater treatment methods mainly include a chemical precipitation method, a biological method, a crystallization method and an adsorption method. The chemical precipitation method is high in operation cost and generates a large amount of chemical sludge difficult to treat; the biological phosphorus removal method is complex in process, high in cost, large in fluctuation of effluent quality and unstable in phosphorus removal effect; the crystallization method is generally used as an advanced treatment method, and is very effective for eutrophication control and deeply phosphorus removal from sewage; and the adsorption method is simple in treatment facility, and stable in treatment effect and capable of recycling adsorption products, which is a good method for treating wide-concentration phosphorus-containing wastewater. The industrial application of wastewater phosphorus removal requires that phosphorus removal adsorbents have a long service period, and the cost of the phosphorus removal adsorbents must be considered, so the low-cost and highly efficient phosphorus removal adsorbents are the key to achieve effective phosphorus removal. Therefore, it is significant to research and develop a kind of phosphorus removal adsorbent with large adsorption capacity, stable property, high efficiency and low cost.

In recent years, for wastewater treatment, various low-cost and readily-available natural adsorbents such as diatomite, zeolite, fly ash and bentonite have been widely studied. In these studies, inorganic salts (chlorine salts, magnesium salts, iron salts, and the like.), metal oxides, cationic surfactants and high molecular alkaline polysaccharides (chitosan) are mainly adopted to modify the natural adsorbents to improve adsorption properties to improve the phosphorus removal efficiency. However, in the prior art, there is no research report on improving the adsorption property of the phosphorus removal adsorbents by using the excellent characteristics of two-dimensional clay itself.

SUMMARY

An objective of the present invention is to provide a novel two-dimensional clay based composite phosphorus removing agent for removing phosphorus in water, and the prepared phosphorus removing agent is low in cost and has efficient phosphorus removal property.

A second objective of the present invention is to provide a preparation method of the two-dimensional clay based composite phosphorus removing agent, and the preparation method is short in time, simple in process, low in cost, easy and feasible.

A third objective of the present invention is to provide application of the two-dimensional clay based composite phosphorus removing agent in an adsorption process of phosphorus-containing wastewater.

A fourth objective of the present invention is that two-dimensional clay is indispensable in a preparation process of the composite phosphorus removing agent and can remarkably improve the phosphorus removal property of the two-dimensional clay based composite phosphorus removing agent.

An objective of the present invention is to provide a wastewater phosphorus removing agent. In view of the specificity of adsorptive removal of phosphorus, the inventors tried early to load a metal oxide on rectorite by using an existing conventional coprecipitation method or the like; however, it was found that the phosphorus removal effect of the materials was not expected. Through deep research, the inventors accidentally find that the phosphorus removal effect of a composite material can be remarkably improved by in-situ compositing of oxide of metal capable of forming water-insoluble precipitate with a phosphate on the two-dimensional clay as a base. It is further found that by using the two-dimensional clay, hydroxide of M metal and urea as raw materials, the in-situ compositing of metal oxides on the two-dimensional clay can be unexpectedly realized by a calcination (roasting) method, and the phosphorus removing agent with excellent adsorption property can be prepared, so the following technical scheme is provided.

A two-dimensional clay based composite phosphorus removing agent includes two-dimensional clay and oxide of the M metal composited on the surface of the two-dimensional clay in situ.

The M metal element is a metal element capable of forming insoluble precipitate with phosphate.

The study of the present invention finds that by compositing the oxide of the M metal on the surface of the two-dimensional clay in situ, the phosphorus removal effect of the material can be unexpectedly and remarkably improved.

According to the phosphorus removing agent of the present invention, an in-situ compositing mode of the two-dimensional clay and the oxide of the M metal is the key to ensure a good phosphorus removal effect of the material.

In the present invention, the phosphate of the M metal element is preferably water-insoluble precipitate. The study further finds that the proper M metal oxide is conductive to further improving the phosphorus removal effect.

Preferably, the M metal element is at least one of calcium, magnesium, lanthanum and aluminum. The study finds that the oxide of the preferred metal element has a better phosphorus removal effect.

Further preferably, the M metal is the lanthanum. The study finds that by compositing lanthanum oxide on the surface of the two-dimensional clay in situ, compared with other oxides, the material has a better phosphorus removal effect.

The two-dimensional clay is at least one of kaolinite, montmorillonite and rectorite.

Preferably, the composite phosphorus removing agent is characterized in that a content of the oxide of the M metal is 15-50%.

The invention further provides a preparation method of the two-dimensional clay based composite phosphorus removing agent obtained by roasting mixed raw materials including the two-dimensional clay, the hydroxide of the M metal and the urea.

In the present invention, in order to successfully prepare the phosphorus removing agent, the problem of synchronous in-situ compositing of the oxide of the M metal needs to be solved. In order to solve the preparation problem, the present inventors creatively find that under the synergistic interaction among the two-dimensional clay, the hydroxide of the M metal and the urea, through roasting transformation, the oxide of the M metal can be composited on the surface of the two-dimensional clay in situ, and the prepared material has an excellent phosphorus removal effect.

The study finds that the hydroxide of the M metal is further beneficial to inducing in-situ sedimentation of the M metal element on the surface of the two-dimensional clay under the synergistic action between the two-dimensional clay structure and the urea, is conductive to further improving the phosphorus removal property, and can also reduce secondary toxicity.

Further preferably, the hydroxide of the M metal is at least one of calcium hydroxide, magnesium hydroxide, lanthanum hydroxide and aluminum hydroxide.

Preferably, the weight ratio of the two-dimensional clay to the hydroxide of the M metal is 1:0.2-1:3, further preferably, 1:1-3.

The study of the present invention finds that the urea can interact with the two-dimensional clay and the hydroxide of the M metal to assist in in-situ compositing of the oxide of the M metal, thereby remarkably improving the property of the prepared phosphorus removing agent.

Preferably, the weight ratio of the mixture of the two-dimensional clay and the hydroxide of the M metal to the urea is 1:2.5-1:20, further preferably, 1:5-20.

Before the two-dimensional clay is used, the two-dimensional clay can be crushed into a needed grain size through an existing method.

Preferably, a roasting process is performed under an oxygen-containing atmosphere. The oxygen-containing atmosphere is preferably air.

In the present invention, the temperature of the roasting process is not lower than the temperature at which the hydroxide of the M metal is converted into corresponding oxide.

Preferably, the roasting temperature is 400-600° C., further preferably, 450-550° C.

Preferably, the roasting time is 1 h-5 h.

The preferred preparation method of the two-dimensional clay based composite phosphorus removing agent according to the present invention includes the following steps:

step (1), crushing the two-dimensional clay into two-dimensional clay powder of −45 μm;

step (2), mixing and uniformly grinding the two-dimensional clay powder and the hydroxide of the M metal to obtain a mixture;

step (3), mixing and uniformly grinding the mixture obtained in step (2) and the urea to obtain a ternary mixture; and step (4), roasting and grinding the ternary mixture obtained in step (3) to obtain the two-dimensional clay based composite phosphorus removing agent.

Preferably, in step (1), the crushing method is traditional mechanical crushing, preferably an ultrafine grinder.

Preferably, in step (2), the weight ratio of the two-dimensional clay powder to the hydroxide is 1:0.2-1:3.

Preferably, in step (2), the hydroxide of the M metal is a metal hydroxide such as calcium hydroxide, magnesium hydroxide, aluminum hydroxide and lanthanum hydroxide.

Preferably, in step (3), the weight ratio of the mixture to the urea is 1:5-1:20.

Preferably, in step (3), the urea is commercially available urea.

The roasting process can be performed in existing conventional equipment, preferably a muffle furnace.

Preferably, the atmosphere for roasting treatment is air.

Preferably, the temperature of roasting treatment is 400-600° C.

Preferably, a temperature rise rate of the roasting process is 3-10° C./min.

Preferably, the roasting time is 1 h-5 h.

According to the two-dimensional clay based composite phosphorus removing agent and the preparation method provided in the present invention, the specific preparation steps includes:

(1) crushing the two-dimensional clay to be 45 μm or below through the ultrafine grinder to prepare the two-dimensional clay powder for standby;

(2) mixing and uniformly grinding 1 part of the two-dimensional clay powder and 0.2-3 parts of the hydroxide of the M metal (lanthanum hydroxide, calcium hydroxide, magnesium hydroxide, aluminum hydroxide and the like);

(3) adding 5-20 parts of the urea into the mixture of step (2), and uniformly grinding the mixture to obtain the ternary mixture; and (4) putting the ternary mixture obtained in step (3) into the muffle furnace, and performing roasting and heat preservation for 1-5 h under the temperature of 400-600° C. (the temperature rise rate is 3-10° C./min) to prepare the two-dimensional clay based composite phosphorus removing agent.

The invention further provides application of the two-dimensional clay based composite phosphorus removing agent in adsorption of phosphorus-containing wastewater.

In the application, the phosphorus removing agent of the present invention is put into the phosphorus-containing wastewater for adsorption and solid-liquid separation to obtain phosphorus-removed effluent water.

Phosphorus in the phosphorus-containing wastewater is preferably orthophosphate.

Compared with the prior art, the present invention has the following characteristics and beneficial effects:

(1) The present invention creatively finds that by compositing the required metal oxide on the two-dimensional clay in situ, the composite phosphorus removing agent has the advantages of excellent phosphorus removal effect, cheap raw materials, safety, no toxicity, wide application range and the like, is easy to recover, and can reduce the treatment difficulty, thus indirectly reducing the operation cost.

(2) The present invention creatively finds that with the two-dimensional clay, the metal hydroxide and the urea as the raw materials, the material with the metal oxide composited on the surface of the two-dimensional clay in situ is prepared by the roasting method, and finds that the material prepared by the method unexpectedly has the excellent phosphorus removal effect and can effectively reduce the content of phosphorus in water.

(3) The preparation process of the present invention is simple, the preparation time is short, the preparation cost is low, and the operation is easy and feasible.

DESCRIPTION OF THE EMBODIMENTS

The present invention provides a two-dimensional clay based composite phosphorus removing agent and a preparation method. The preparation method includes the specific preparation steps that:

(1) two-dimensional clay is crushed to be 45 μm or below through an ultrafine grinder to prepare two-dimensional clay powder for standby;

(2) 1 part of the two-dimensional clay powder and 0.2-3 parts of hydroxide of M metal (lanthanum hydroxide, calcium hydroxide, magnesium hydroxide, aluminum hydroxide and the like) are mixed and uniformly ground;

(3) 5-20 parts of urea are added into the mixture of step (2), and the mixture is uniformly ground to obtain a ternary mixture; and (4) the ternary mixture obtained in step (3) is put into a muffle furnace, and roasting and heat preservation are performed for 1-5 h under the temperature of 400-600° C. (a temperature rise rate is 3-10° C./min) to prepare the two-dimensional clay based composite phosphorus removing agent.

The present invention is further illustrated in combination with the following embodiments.

The block-shaped two-dimensional clay (rectorite, kaolinite and montmorillonite) is crushed to be 45 μm or below through the ultrafine grinder to prepare the two-dimensional clay powder used for the following embodiments.

Embodiment 1

(1) 0.1 g of rectorite powder and 0.1 g of lanthanum hydroxide are weighed, mixed and uniformly ground to obtain a mixture of the rectorite and the lanthanum hydroxide;

(2) 1 g of urea is weighed and added into the mixture obtained in step (1), and the mixture is uniformly ground to obtain a ternary mixture of the rectorite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Figure 1:
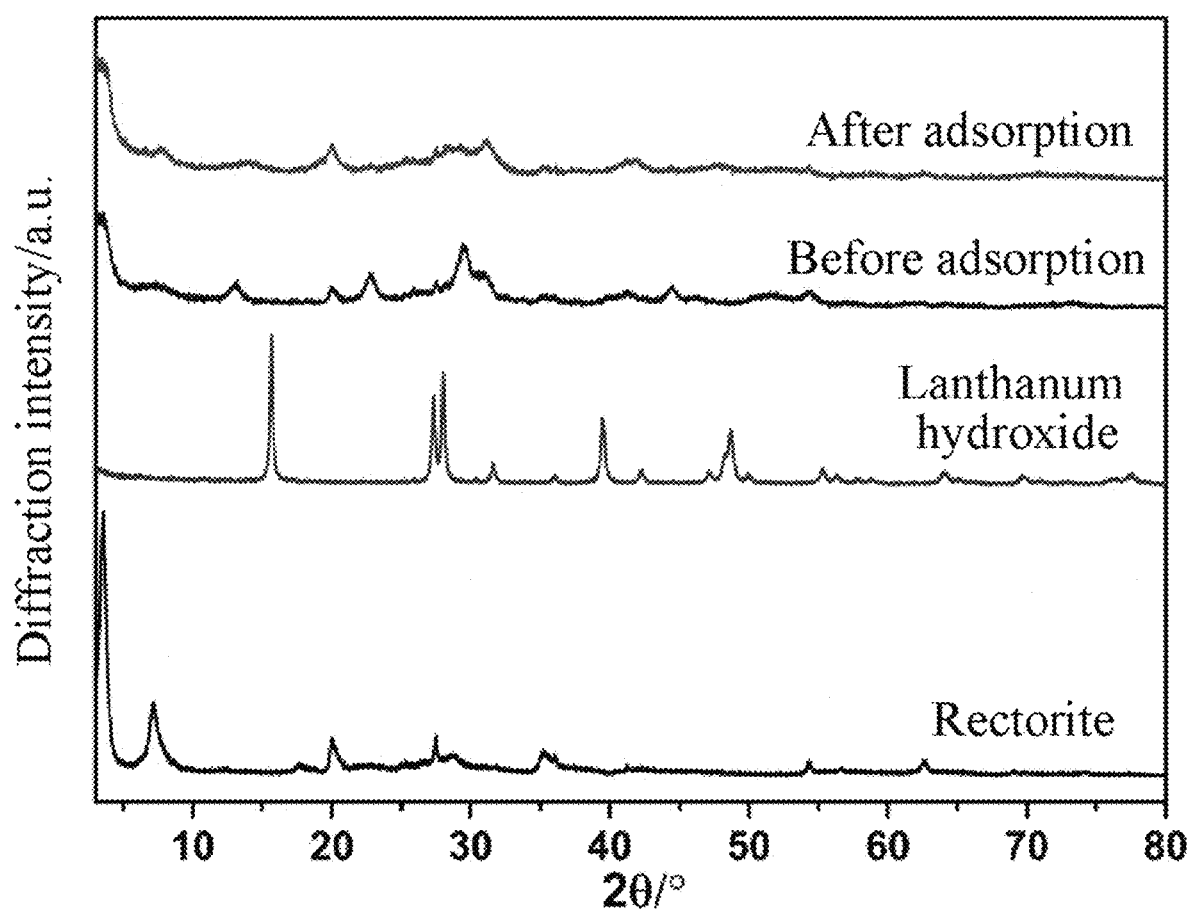
FIG. 1 is an X-ray diffraction diagram of raw materials and a prepared rectorite based composite phosphorus removing agent before and after phosphorus adsorption according to Embodiment 1 of the present invention.

Detection Tests:

1. The raw materials and the rectorite based composite phosphorus removing agent before and after phosphorus adsorption in Embodiment 1 are taken for wide-angle X-ray diffraction analysis, the result is shown in FIG. 1, lanthanum oxide is composited in situ in a roasting process, and the structure of the rectorite is not destroyed. The rectorite based composite phosphorus removing agent changes obviously in a phosphorus adsorption process.

Figure 2A:
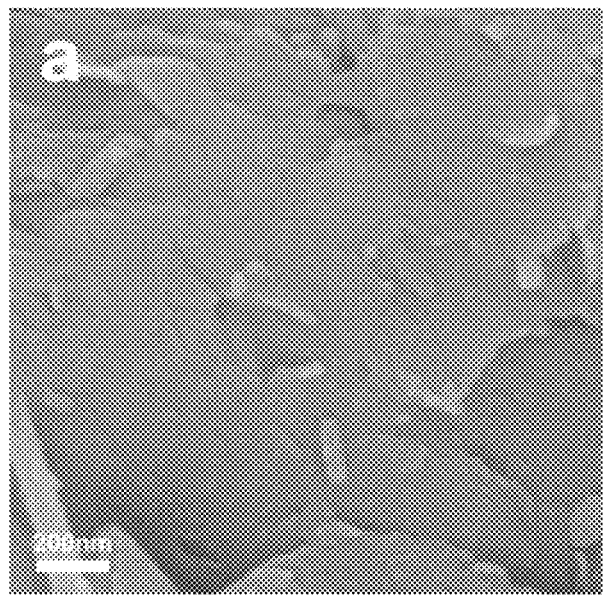
FIGS. 2a to 2d are scanning electron micrographs of the raw materials and the prepared rectorite based composite phosphorus removing agent before and after phosphorus adsorption according to Embodiment 1 of the present invention.
Figure 2B:
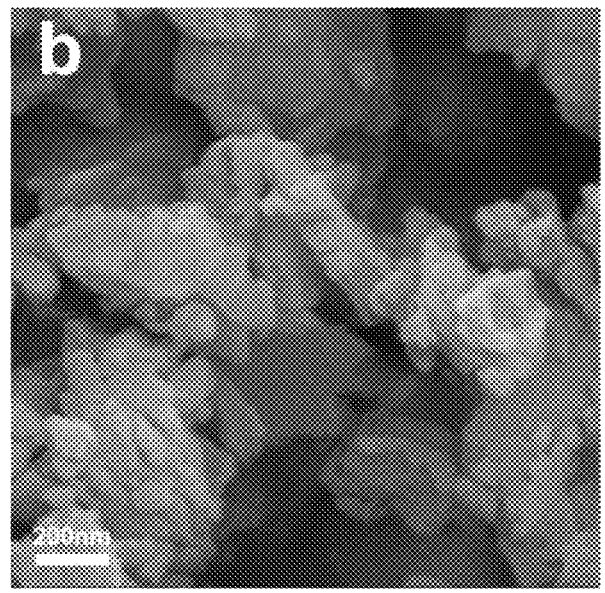
Figure 2C:
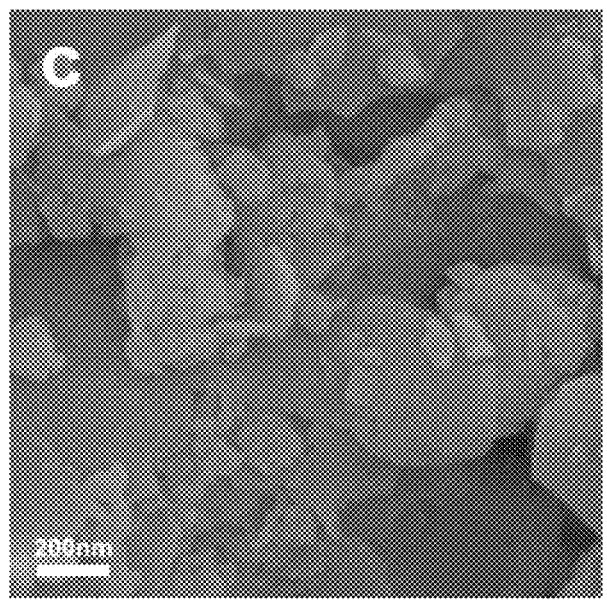
Figure 2D:
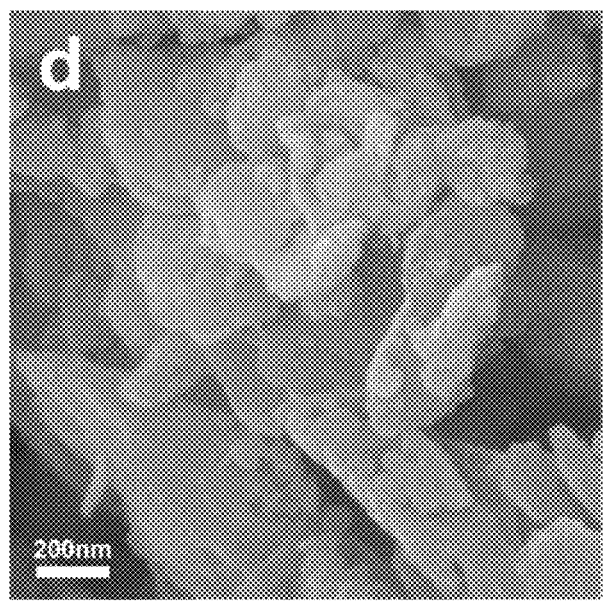

2. The raw materials and the rectorite based composite phosphorus removing agent before and after phosphorus adsorption in Embodiment 1 are taken for SEM analysis, and the result is shown in FIGS. 2a to 2d. FIG. 2a is an SEM graph of rectorite, FIG. 2b is an SEM graph of lanthanum hydroxide, FIG. 2c is an SEM graph of the rectorite based composite phosphorus removing agent before adsorption, and FIG. 2d is an SEM graph of the rectorite based composite phosphorus removing agent after adsorption. From the graphs, it can be seen that the rectorite is of a stacked compact layered structure, and the edge of the layered structure is curl; the lanthanum hydroxide is granular and agglomerated; the rectorite in the rectorite based composite phosphorus removing agent reserves the layered structure, lanthanum compound particles become smaller and are dispersed uniformly, the lanthanum oxide is composited on the surface of the rectorite in situ, and such morphology feature is beneficial to improving the phosphorus removal property of the rectorite based composite phosphorus removing agent; and after phosphorus adsorption, the phosphorus exists on the surface of the rectorite based composite phosphorus removing agent.

Figure 3A:
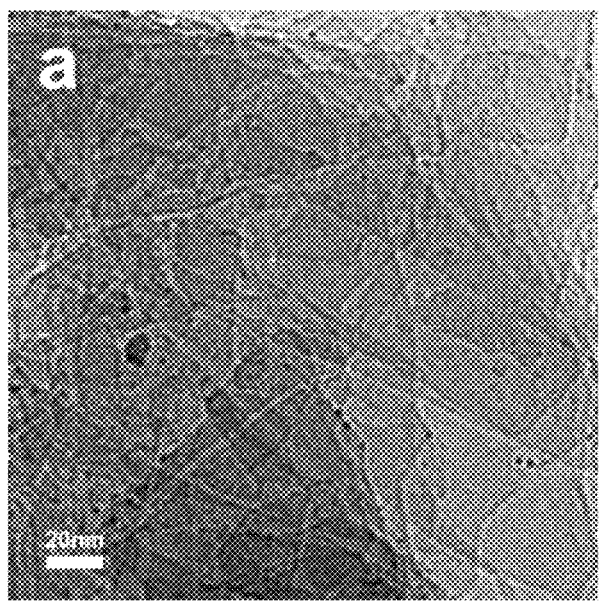
FIGS. 3a to 3d are transmission electron micrographs of the raw materials and the prepared rectorite based composite phosphorus removing agent before and after phosphorus adsorption according to Embodiment 1 of the present invention.
Figure 3B:
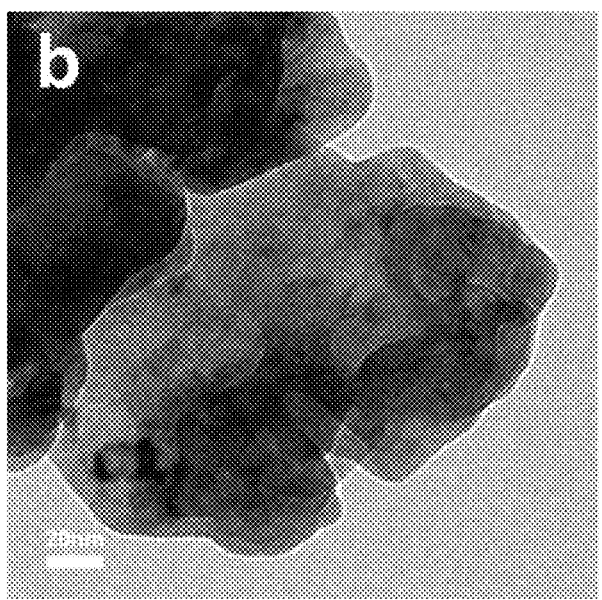
Figure 3C:
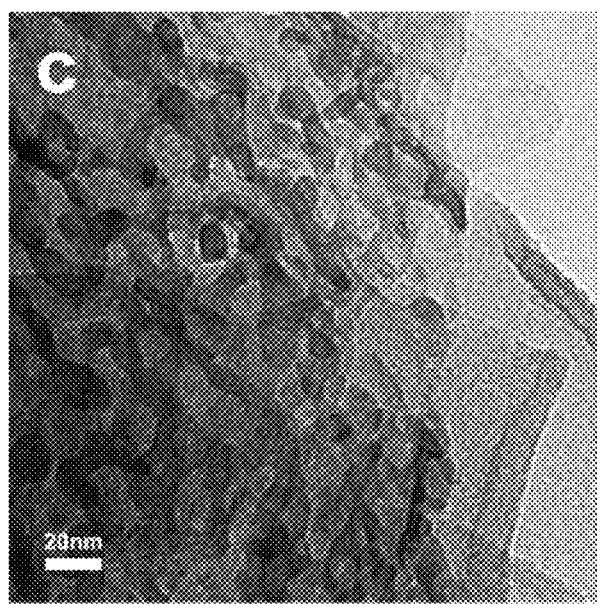
Figure 3D:
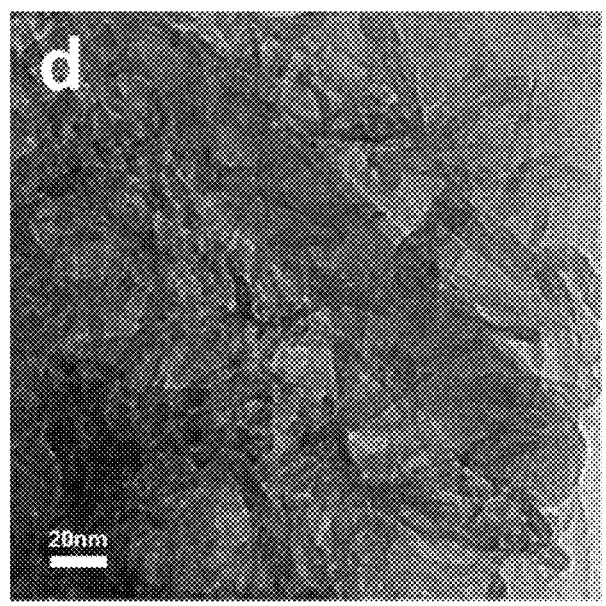

3. The raw materials and the rectorite based composite phosphorus removing agent before and after phosphorus adsorption in Embodiment 1 are taken for TEM analysis, and the result is shown in FIGS. 3a to 3d. FIG. 3a is a TEM graph of rectorite, FIG. 3b is a TEM graph of lanthanum hydroxide, FIG. 3c is a TEM graph of the rectorite based composite phosphorus removing agent before adsorption, and FIG. 3d is a TEM graph of the rectorite based composite phosphorus removing agent after adsorption. From the graphs, it can be seen that the rectorite structure is layered and the lanthanum hydroxide is agglomerated; and the rectorite in the rectorite based composite phosphorus removing agent prepared by a roasting method reserves the layered structure, the lanthanum oxide is composited on the surface of the rectorite in a scale-like shape, and the morphology of the lanthanum oxide after phosphorus adsorption of the rectorite based composite phosphorus removing agent changes into a strip shape.

Figure 4:
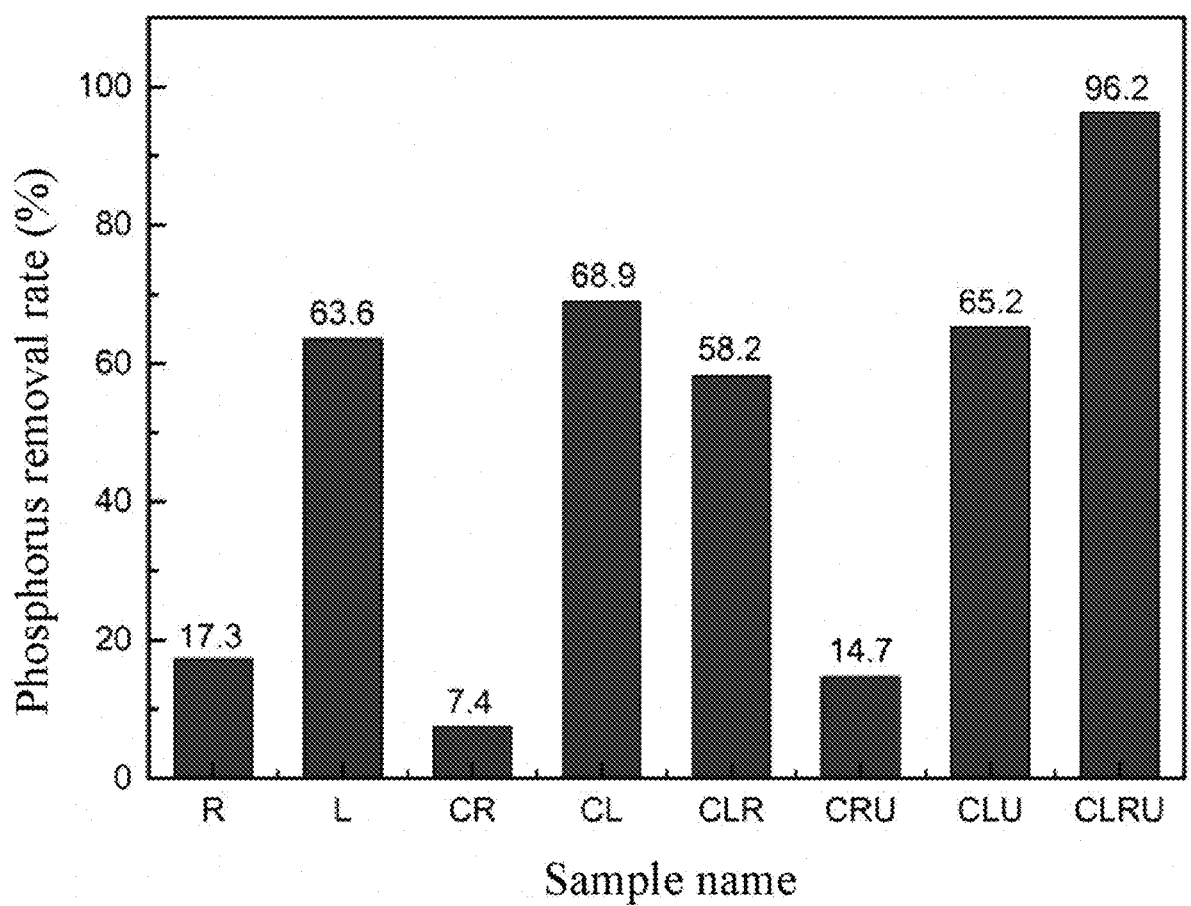
FIG. 4 is a phosphorus removal property comparison result of the raw materials and the corresponding composite phosphorus removing agent according to Embodiment 1 of the present invention. R: rectorite; L: lanthanum hydroxide; CR: a roasted product of rectorite; CL: a roasted product of lanthanum hydroxide; CLR: a mixed roasted product of rectorite and lanthanum hydroxide; CRU: a mixed roasted product of rectorite and urea; CLU: a mixed roasted product of lanthanum hydroxide and urea; and CLRU: a rectorite based composite phosphorus removing agent.

4. FIG. 4 is a phosphorus removal property comparison result of rectorite, lanthanum hydroxide, a roasted product of rectorite, a roasted product of lanthanum hydroxide, a mixed roasted product of rectorite and lanthanum hydroxide, a mixed roasted product of rectorite and urea, a mixed roasted product of lanthanum hydroxide and urea and a rectorite based composite phosphorus removing agent under the conditions with TP concentration of 50 mg/L, sewage volume of 50 mL and dosage of 1 g/L when the preparation process is the same as that of Embodiment 1. As shown in FIG. 4, under the same conditions, the phosphorus removal effect of the rectorite based composite phosphorus removing agent is obviously higher than the phosphorus removal effect of rectorite and lanthanum hydroxide used separately, indicating that components of the rectorite based composite phosphorus removing agent have a synergic phosphorus removal function. The phosphorus removal effect of a composite phosphorus removing agent without rectorite is lower than that of the composite phosphorus removing agent with the rectorite, indicating that the rectorite is indispensable in the preparation process of the composite phosphorus removing agent.

Embodiment 2

(1) 0.1 g of rectorite powder and 0.1 g of calcium hydroxide are weighed, mixed and uniformly ground to obtain a mixture of the rectorite and the calcium hydroxide;

(2) 1 g of urea is weighed and added into the mixture obtained in step (1), and the mixture is uniformly ground to obtain a ternary mixture of the rectorite, the calcium hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 3

(1) 0.1 g of rectorite powder and 0.1 g of magnesium hydroxide are weighed, mixed and uniformly ground to obtain a mixture of the rectorite and the magnesium hydroxide;

(2) 1 g of urea is weighed and added into the mixture obtained in step (1), and the mixture is uniformly ground so obtain a ternary mixture of the rectorite, the magnesium hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 4

(1) 0.1 g of rectorite powder and 0.1 g of aluminum hydroxide are weighed, mixed and uniformly ground to obtain a mixture of the rectorite and the aluminum hydroxide;

(2) 1 g of urea is weighed and added into the mixture obtained in step (1), and the mixture is uniformly ground to obtain a ternary mixture of the rectorite, the aluminum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 5

(1) 0.3 g of rectorite powder and 0.1 g of lanthanum hydroxide are weighed, mixed and uniformly ground to obtain a mixture of the rectorite and the lanthanum hydroxide;

(2) 1 g of urea is weighed and added into the mixture obtained in step (1), and the mixture is uniformly ground to obtain a ternary mixture of the rectorite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 6

(1) 0.1 g of rectorite powder and 0.1 g of lanthanum hydroxide are weighed, mixed and uniformly ground to obtain a mixture of the rectorite and the lanthanum hydroxide;

(2) 4 g of urea is weighed and added into the mixture obtained in step (1), and the mixture is uniformly ground so obtain a ternary mixture of the rectorite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 7

(1) 0.1 g of rectorite powder and 0.1 g of lanthanum hydroxide are weighed, mixed and uniformly ground to obtain a mixture of the rectorite and the lanthanum hydroxide;

(2) 1 g of urea is weighed and added into the mixture obtained in step (1), and the mixture is uniformly ground to obtain a ternary mixture of the rectorite, the lanthanum hydroxide and the urea; and (3) the ternary mixture obtained in step (2) is put into a muffle furnace (air atmosphere), and roasting and heat preservation are performed for 3 h under the temperature of 550° C. (a temperature rise rate is 5° C./min), so that a rectorite based composite phosphorus removing agent is prepared, and the phosphorus removal property of the rectorite based composite phosphorus removing agent is shown in Table 1.

Embodiment 8

(1) 0.1 g of rectorite powder and 0.1 g of lanthanum hydroxide are weighed, mixed and uniformly ground to obtain a mixture of the rectorite and the lanthanum hydroxide;

(2) 1 g of urea is weighed and added into the mixture obtained in step (1), and the mixture is uniformly ground to obtain a ternary mixture of the rectorite, the lanthanum hydroxide and the urea; and (3) the ternary mixture obtained in step (2) is put into a muffle furnace (air atmosphere), and roasting and heat preservation are performed for 5 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Embodiment 9

(1) 0.1 g of rectorite powder and 0.1 g of lanthanum hydroxide are weighed, mixed and uniformly ground to obtain a mixture of the rectorite and the lanthanum hydroxide;

(2) 1 g of urea is weighed and added into the mixture obtained in step (1), and the mixture is uniformly ground to obtain a ternary mixture of the rectorite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 10° C./min), so that a rectorite based composite phosphorus removing agent is prepared, and the phosphorus removal property of the rectorite based composite phosphorus removing agent is shown in Table 1.

Embodiment 10

(1) 0.1 g of kaolinite powder and 0.1 g of lanthanum hydroxide are weighed, mixed and uniformly ground to obtain a mixture of the kaolinite and the lanthanum hydroxide;

(2) 1 g of urea is weighed and added into the mixture obtained in step (1), and the mixture is uniformly ground to obtain a ternary mixture of the kaolinite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a kaolinite based composite phosphorus removing agent is prepared, and the phosphorus removal property of the kaolinite based composite phosphorus removing agent is shown in Table 1.

Embodiment 11

(1) 0.1 g of montmorillonite powder and 0.1 g of lanthanum hydroxide are weighed, mixed and uniformly ground to obtain a mixture of the montmorillonite and the lanthanum hydroxide;

(2) 1 g of urea is weighed and added into the mixture obtained in step (1), and the mixture is uniformly ground to obtain a ternary mixture of the montmorillonite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a montmorillonite based composite phosphorus removing agent is prepared, and the phosphorus removal property of the montmorillonite based composite phosphorus removing agent is shown in Table 1.

Comparative Example 1

(1) 0.1 g of rectorite powder and 0.1 g of lanthanum carbonate are weighed, mixed and uniformly ground to obtain a mixture of the rectorite and the lanthanum carbonate;

(2) 1 g of urea is weighed and added into the mixture obtained in step (1), and the mixture is uniformly ground to obtain a ternary mixture of the rectorite, the lanthanum carbonate and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Comparative Example 2

(1) 0.1 g of tubular halloysite powder and 0.1 g of lanthanum hydroxide are weighed, mixed and uniformly ground to obtain a mixture of the tubular halloysite and the lanthanum hydroxide;

(2) 1 g of urea is weighed and added into the mixture obtained in step (1), and the mixture is uniformly ground to obtain a ternary mixture of the tubular halloysite, the lanthanum hydroxide and the urea; and (3) the ternary mixture obtained in step (2) is put into a muffle furnace (air atmosphere), and roasting and heat preservation are performed for 3 h under the temperature of 450° C. (a temperature rise rate is 5° C./min), so that a tubular halloysite based composite phosphorus removing agent is prepared, and the phosphorus removal property of the tubular halloysite based composite phosphorus removing agent is shown in Table 1.

Comparative Example 3

(1) 0.1 g of rectorite powder and 0.1 g of lanthanum hydroxide are weighed, mixed and uniformly ground to obtain a mixture of the rectorite and the lanthanum hydroxide; and (2) the mixture obtained in step (1) is put into a muffle furnace (air atmosphere), and roasting and heat preservation are performed for 3 h under the temperature of 450° C. (a temperature rise rate is 5° C./min), so that a rectorite based composite phosphorus removing agent is prepared, and the phosphorus removal property of the rectorite based composite phosphorus removing agent is shown in Table 1.

Comparative Example 4

(1) 0.1 g of lanthanum hydroxide and 1 g of urea are weighed, mixed and uniformly ground to obtain a mixture of the lanthanum hydroxide and the urea; and (2) the mixture obtained in step (1) is put into a muffle furnace (air atmosphere), and roasting and heat preservation are performed for 3 h under the temperature of 450° C. (a temperature rise rate is 5° C./min), so that a composite phosphorus removing agent is prepared, and the phosphorus removal property of the composite phosphorus removing agent is shown in Table 1.

Comparative Example 5

An ex-situ compositing comparative example includes the specific operations as follows:

(1) 0.1 g of lanthanum hydroxide and 1 g of urea are weighed, mixed and uniformly ground to obtain a mixture of the lanthanum hydroxide and the urea;

(2) the mixture obtained in step (1) is put into a muffle furnace (air atmosphere), calcining and heat preservation are performed for 3 h under the temperature of 450° C. (a temperature rise rate is 5° C./min), and a calcined product is standby; and (3) the calcined product obtained in step (2) and 0.1 g of rectorite are ball-milled and mixed, so that a composite phosphorus removing agent is prepared, and the phosphorus removal property of the composite phosphorus removing agent is shown in Table 1.

TABLE 1

Phosphorus Removal Property of Two-dimensional Clay Based Composite Phosphorus Removing Agents of All Embodiments and Materials of Comparative Examples

| Embodiment | Sewage Volume (mL) | TP Concentration Before Adsorption (mg/L) | TP Concentration After Adsorption (mg/L) | Dosage (g/L) | Phosphorus Removal Rate (%) |
|---|---|---|---|---|---|
| Embodiment 1 | 50 | 100 | 0.01 | 4 | 99.99 |
| Embodiment 2 | 50 | 100 | 0.03 | 6 | 99.97 |
| Embodiment 3 | 50 | 100 | 0.65 | 6 | 99.35 |
| Embodiment 4 | 50 | 100 | 0.57 | 6 | 99.43 |
| Embodiment 5 | 50 | 100 | 1.42 | 8 | 98.58 |
| Embodiment 6 | 50 | 100 | 0.78 | 4 | 99.22 |
| Embodiment 7 | 50 | 100 | 0.06 | 4 | 99.94 |
| Embodiment 8 | 50 | 100 | 0.01 | 4 | 99.99 |
| Embodiment 9 | 50 | 100 | 0.35 | 4 | 99.65 |
| Embodiment 10 | 50 | 100 | 0.01 | 4 | 99.99 |
| Embodiment 11 | 50 | 100 | 0.01 | 4 | 99.99 |
| Comparative Example 1 | 50 | 100 | 18.41 | 4 | 81.59 |
| Comparative Example 2 | 50 | 100 | 14.51 | 4 | 85.49 |
| Comparative Example 3 | 50 | 100 | 29.19 | 4 | 70.81 |
| Comparative Example 4 | 50 | 100 | 28.68 | 4 | 71.32 |
| Comparative Example 5 | 50 | 100 | 38.82 | 4 | 61.18 |

From Table 1, it can be seen that by adoption of in-situ roasting of the two-dimensional clay, the metal hydroxide and the urea, the composite material with the metal oxide composited on the two-dimensional material in situ is obtained, and the material with the good phosphorus removal property can be prepared. When replacing the metal hydroxide with carbonate, replacing the two-dimensional clay with one-dimensional clay, not adding the urea or the like, the foregoing material cannot be obtained and the phosphorus removal property of the foregoing material is obviously affected.

What is claimed is:

1. A two-dimensional clay based composite phosphorus removing agent, comprising:
   two-dimensional clay; and
   oxide of M metal composited on a surface of the two-dimensional clay in situ;
   wherein the M metal is a metal capable of forming insoluble precipitate with phosphate, and a content of the oxide of the M metal is 15-50%.

2. The two-dimensional clay based composite phosphorus removing agent according to claim 1, wherein the two-dimensional clay is at least one of kaolinite, montmorillonite and rectorite.

3. The two-dimensional clay based composite phosphorus removing agent according to claim 1, wherein the M metal is at least one of calcium, magnesium, lanthanum and aluminum.

4. A preparation method of the two-dimensional clay based composite phosphorus removing agent according to claim 1, wherein the two-dimensional clay based composite phosphorus removing agent is obtained by roasting mixed raw materials comprising the two-dimensional clay, hydroxide of the M metal and urea.

5. The preparation method of the two-dimensional clay based composite phosphorus removing agent according to claim 4, wherein the hydroxide of the M metal is at least one of calcium hydroxide, magnesium hydroxide, lanthanum hydroxide and aluminum hydroxide.

6. The preparation method of the two-dimensional clay based composite phosphorus removing agent according to claim 4, wherein a weight ratio of the two-dimensional clay powder to the hydroxide of the M metal is 1:0.2-3.

7. The preparation method of the two-dimensional clay based composite phosphorus removing agent according to claim 6, wherein the weight ratio of the two-dimensional clay powder to the hydroxide of the M metal is 1:1-3.

8. The preparation method of the two-dimensional clay based composite phosphorus removing agent according to claim 4, wherein a weight ratio of a mixture of the two-dimensional clay and the hydroxide of the M metal to the urea is 1:2.5-20.

9. The preparation method of the two-dimensional clay based composite phosphorus removing agent according to claim 8, wherein the weight ratio of a mixture of the two-dimensional clay and the hydroxide of the M metal to the urea is 1:5-20.

10. The preparation method of the two-dimensional clay based composite phosphorus removing agent according to claim 4, wherein a roasting process is performed under an oxygen-containing atmosphere.

11. The preparation method of the two-dimensional clay based composite phosphorus removing agent according to claim 4, wherein roasting temperature of the roasting process is not lower than temperature at which the hydroxide of the M metal is converted into corresponding oxide.

12. The preparation method of the two-dimensional clay based composite phosphorus removing agent according to claim 11, wherein the roasting temperature is 400-600° C., and roasting time is 1-5 h.

13. A preparation method of the two-dimensional clay based composite phosphorus removing agent according to claim 2, wherein the two-dimensional clay based composite phosphorus removing agent is obtained by roasting mixed raw materials comprising the two-dimensional clay, hydroxide of the M metal and urea.

14. A preparation method of the two-dimensional clay based composite phosphorus removing agent according to claim 3, wherein the two-dimensional clay based composite phosphorus removing agent is obtained by roasting mixed raw materials comprising the two-dimensional clay, hydroxide of the M metal and urea.

15. A method for adsorption of phosphorus-containing wastewater, comprising using the two-dimensional clay based composite phosphorus removing agent according to claim 1.

16. A method for adsorption of phosphorus-containing wastewater, comprising using the two-dimensional clay based composite phosphorus removing agent prepared according to the preparation method of claim 4.

\* \* \* \* \*